United States Patent [19]
Orefice

[11] 3,915,517
[45] Oct. 28, 1975

[54] SLACK ADJUSTING BUSHING
[75] Inventor: Anthony E. Orefice, Brooklyn, N.Y.
[73] Assignee: The Raymond Lee Organization Inc., a part interest
[22] Filed: Jan. 15, 1974
[21] Appl. No.: 433,601

[52] U.S. Cl. ................. 308/70; 308/63; 308/237 R
[51] Int. Cl.² .................... F16C 23/00; F16C 25/00; F16C 27/00; F16C 35/00
[58] Field of Search .................... 308/63, 70, 237 R

[56] References Cited
UNITED STATES PATENTS

| | | | |
|---|---|---|---|
| 168,344 | 10/1875 | Sage | 308/70 X |
| 478,292 | 7/1892 | Simcox | 308/63 X |
| 479,039 | 7/1892 | VanBenthuysen | 308/70 |
| 748,625 | 1/1904 | Lindsay | 308/63 X |
| 1,890,604 | 12/1932 | Gottmanns | 308/70 |
| 2,386,946 | 10/1945 | Greiner et al. | 308/63 X |

Primary Examiner—M. Henson Wood, Jr.
Assistant Examiner—Howard Beltran
Attorney, Agent, or Firm—Howard I. Podell

[57] ABSTRACT

An adjustable bushing with provision to control the degree of fit between the rotating shaft and the bushing, including provisions to take up slackness caused by wear. The bushing member is in the form of a helical spring mounted in a tapered housing, said bushing member being keyed to prevent rotation in the external hole in which it lies. An adjustable tapered compression member applies radial pressure to the bushing in the tapered housing, with an increase in such pressure acting to both proportionately reduce the length of the bushing assembly and to reduce the inner diameter of the bushing.

2 Claims, 3 Drawing Figures

SLACK ADJUSTING BUSHING

BACKGROUND OF THE INVENTION

The use of bushings to furnish bearing support to rotating shafts requires periodic replacement because of the wear. Because of the difficulties of replacement, conventional bushings rarely maintain the proper degree of fit with the rotating shaft.

In my invention, the bushing may be readily adjusted so as to reduce or increase the diameter of the bushing hole over a wide range, and thus eliminates a large part of the requirements for replacement.

An additional feature of my invention is that the adjustment provisions lessen the need for precision machining of the bushing and thus reduces the expense of the initial cost of the product.

A further advantage lies in the fact that in the event of replacement, the bushing may be readily removed without the conventional requirements of excessive force, and without the necessary apparatus conventionally employed.

SUMMARY OF THE INVENTION

My invention relates to an adjustable bushing which is formed in the shape of a helix. In the relaxed condition, the outer diameter of this helix may be undersize in the bore of mounting hole of the bushing housing, and the inner diameter of the bushing may be greater than the shaft diameter which is designed to rotate in the bushing.

After the bushing has been inserted in the mounting hole, a compression gland with an internal tapered bore is mounted so as to apply the proper amount of radial pressure to the helix, thus reducing its minor diameter until the desired degree of fit between the bushing minor diameter and the shaft diameter is reached. The bushing is readily lubricated by means of oil introduced into the spaces between the spirals of the helix. The bushing may be designed with an external key member which mates with a longitudinal slot in the bushing mount.

DESCRIPTION OF THE DRAWING

The objects and features of the invention may be understood with reference to the following detailed description of an illustrative embodiment of the invention taken together with the accompanying drawing in which.

DESCRIPTION OF THE PREFERRED EMBODIMENT

Figure 1:
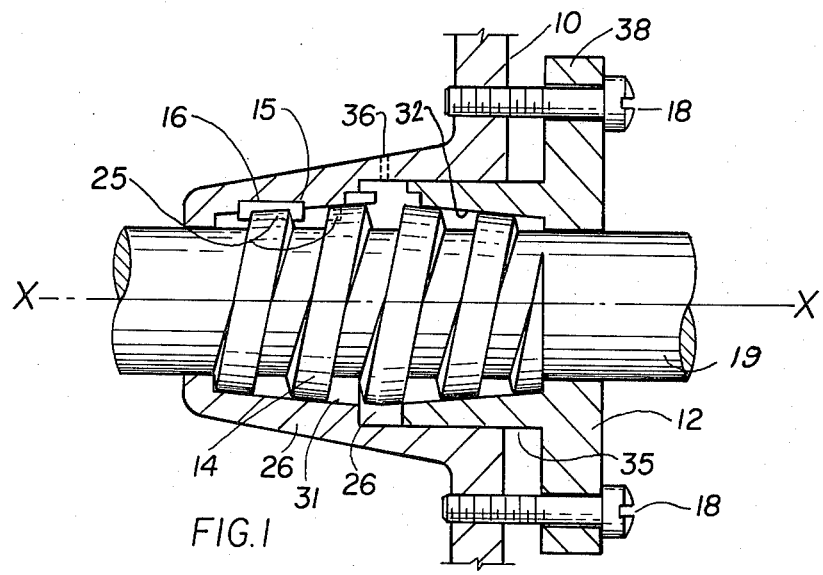
FIG. 1 is a sectional view of the invention.

Turning now descriptively to the drawing in which similar reference characters denote similar elements throughout the several views, FIG. 1 depicts the bushing assembly 10. The bushing 10 comprises of helical spring member 14, a compression gland 12 and a housing 26. A rotatable shaft 19 may be inserted through the bore of spring member 14. Tightening of compression gland 12 to housing 26, by means of screws 18, reduces the minor diameter of helical spring 14 about shaft 19. Key 15 is permanently fastened to a slot in the external surface of a winding of helical member 14 so as to fit in keyway 16 of housing 26.

Oil is fed from orifice 36 to spaces between the windings of helical spring 14.

Figure 3:
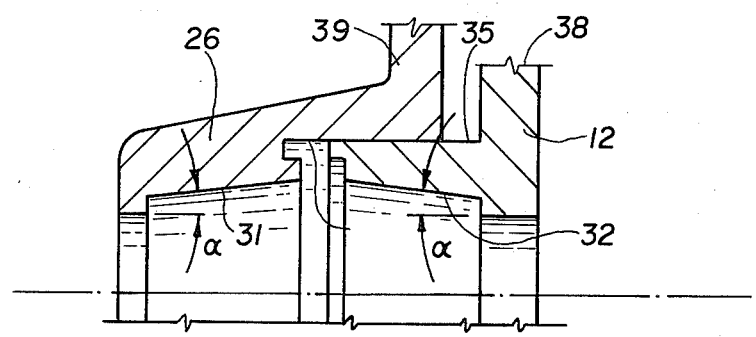
FIG. 3 is a fragmentary sectional view of the housing of the bushing.

As shown in FIGS. 1 and 3, the walls 31 of the bore of housing 26, and the walls 32 of the bore of the compression gland 12 are tapered so as to increase the diameter of the bore from each end of the bore to the mid-section. The angle of taper of the bore walls 31 and 32, with respect to the axis X—X of the bearing axis, is of a magnitude to reduce the external and internal diameters of the helix spring member 14 as compression gland 14 is forced longitudinally into housing 26 by tightening of screws 18. Compression gland 14, in the preferred embodiment is formed with cylindrical outer walls 35 which fit snugly in the cylindrical inner walls 37 of the housing 26. An integral flange member 38 is fitted with holes to engage fastening screws 18 that are threadably engaged in the flange 39 of housing 26.

Figure 2:
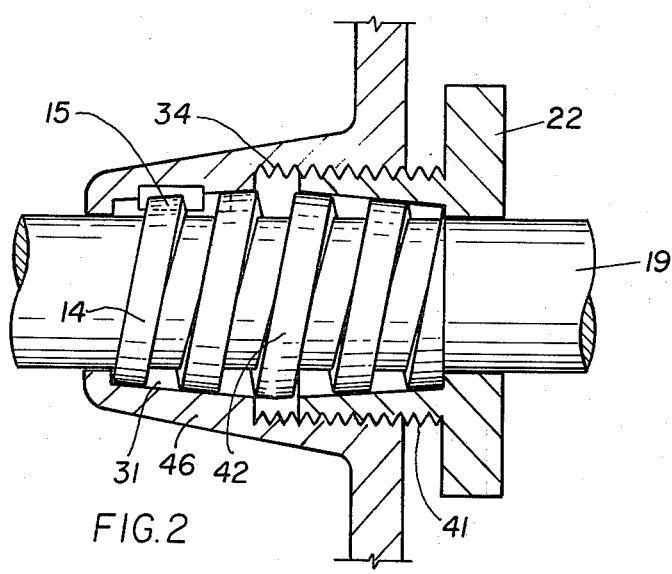
FIG. 2 is a sectional view of an alternate embodiment of the invention.

An alternate embodiment is shown in FIG. 2 with the compression gland 22 being formed with an external thread 41 to mate with internal thread 34 of the housing 46, with rotation of the compression gland 22 in relation to housing 46 serving to adjust the length of captive helix spring member 14.

The bushing helical spring member 14 may be fabricated of metal, including bronze alloys, or of plastic material, and particularly of nylon or teflon material.

The outer walls 42 of the bushing helical spring 14 may be tapered to lie flat against the tapered walls 31 and 32 of the housing and compression gland or the outer walls 42 of the helical bushing may be rounded or of other shape so as to permit sliding rotational adjustment of the windings helical spring 14 against bore walls 31 and 32 as the length and outer diameters of the spring 14 are varied by adjustment of compression gland 12.

Since obvious changes may be made in the specific embodiment of the invention described herein without departing from the scope thereof, it is indicated that all matter contained herein is intended to be interpreted in an illustrative and not in a limiting sense.

Having thus described the invention, what I claim as new and desire to secure by Letters Patent of the United States is:

1. An adjustable bushing with provision to vary the minor diameter of the bearing member of the bushing by varying the length of said bearing member so as to provide a cylindrical bearing surface of optimum diameter with relation to a rotatable shaft mountable in the bore of the bearing member comprising a housing member fitted with a tapered bore, a compression gland which is adjustably engaged with said housing member to form a fixed bearing member section, said gland fitted with a similar tapered bore, with the diameter of both bores decreasing from the mid-section of the joined bores, a helical spring, that serves as the bearing member of the device, which is complementarily tapered to fit in the tapered bores of the housing member and the compression gland, said spring shaped, with the internal walls of the turns of the spring lying adjacent to the external surface of a shaft in rotatable engagement with said internal spring walls, and with the opposed external walls of the turns of the spring lying adjacent to the tapered bore walls of the housing member and the gland member in which the spring is installed, together with means to adjust the spacing along the axis of the device between the housing member and the compression gland so as to vary the length and consequently the internal diameter of the helical spring member.

2. The combination as recited in claim 1 in which one winding of said helical spring is keyed to a fixed bearing member section so as to prevent rotation of the helical spring as a unit inside of the joined tapered bores of the fixed bearing member section.

* * * * *